May 13, 1924.

L. MURRAY

BELT AND PROCESS OF MAKING THE SAME

Filed Nov. 23, 1921  3 Sheets-Sheet 1

1,494,075

INVENTOR
LEE MURRAY
By Paul & Paul
Attorneys

May 13, 1924.

L. MURRAY

BELT AND PROCESS OF MAKING THE SAME

Filed Nov. 28, 1921   3 Sheets-Sheet 2

INVENTOR
LEE MURRAY
By Paul & Paul
Attorneys

INVENTOR
LEE MURRAY

Patented May 13, 1924.

1,494,075

UNITED STATES PATENT OFFICE.

LEE MURRAY, OF MINNEAPOLIS, MINNESOTA, ASSIGNOR TO DURKEE-ATWOOD COMPANY, OF MINNEAPOLIS, MINNESOTA, A CORPORATION OF MINNESOTA.

BELT AND PROCESS OF MAKING THE SAME.

Application filed November 26, 1921. Serial No. 518,231.

*To all whom it may concern:*

Be it known that I, LEE MURRAY, a citizen of the United States, resident of Minneapolis, county of Hennepin, State of Minnesota, have invented certain new and useful Improvements in Belts and Processes of Making the Same, of which the following is a specification.

My invention relates to the so-called "round" type, used generally for transmitting a light power, and hence adapted for a great variety of uses.

The primary object of my present invention is to provide a belt composed of suitable fabric, preferably rubberized, and including means for limiting the degree of stretch of the belt and at the same time making it much stronger and more durable.

My invention consists generally in a belt of the construction hereinafter described and a process of making such a belt.

Figure 1:
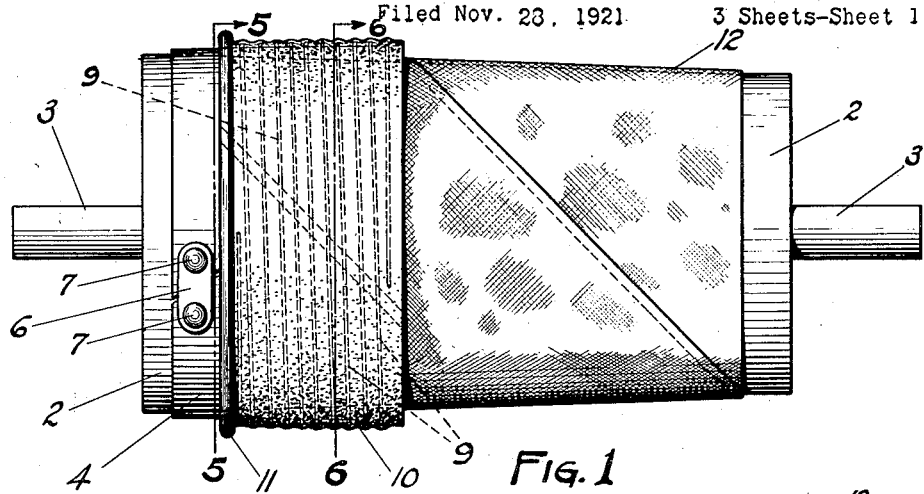
Figure 2:
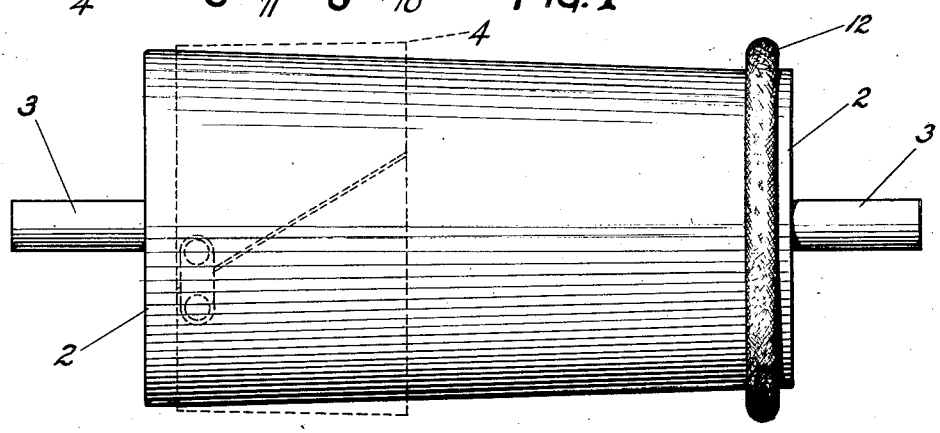
Figure 3:
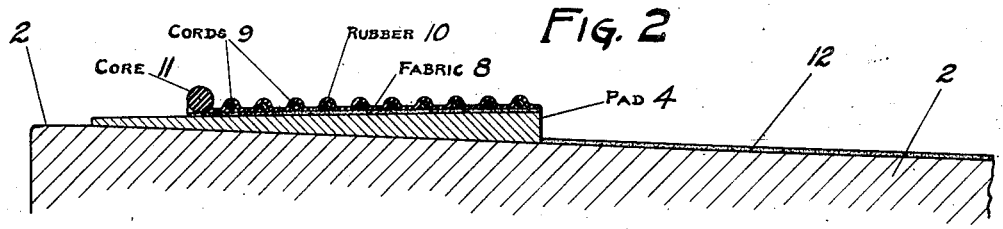
Figure 4:
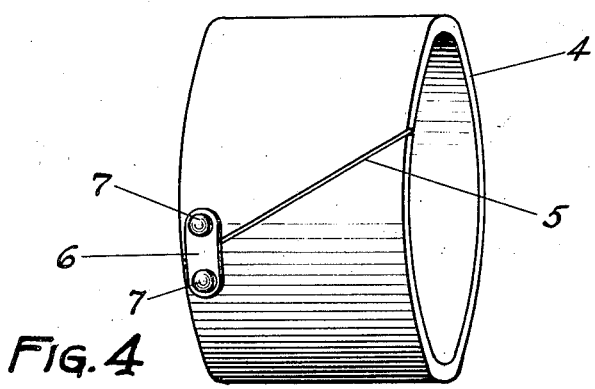
Figure 5:
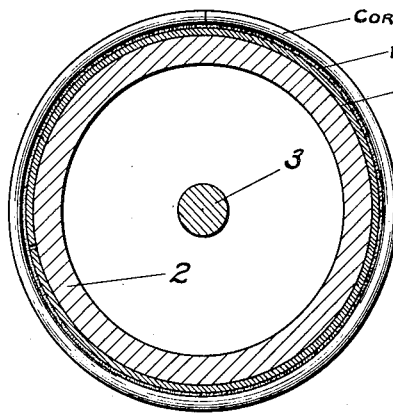
Figure 6:
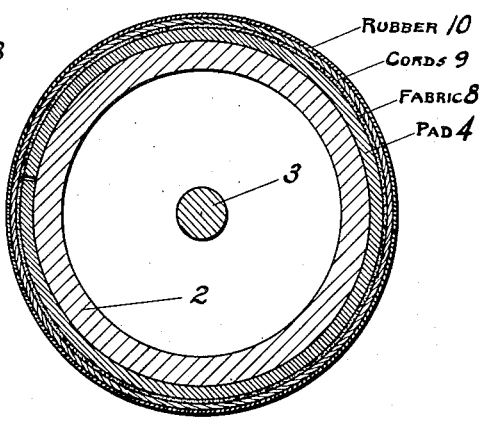
Figure 7:
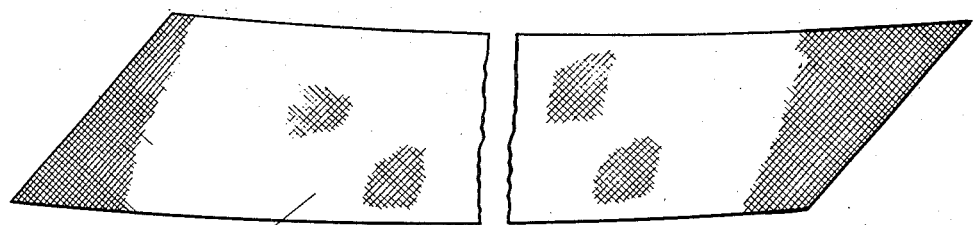
Figure 8:
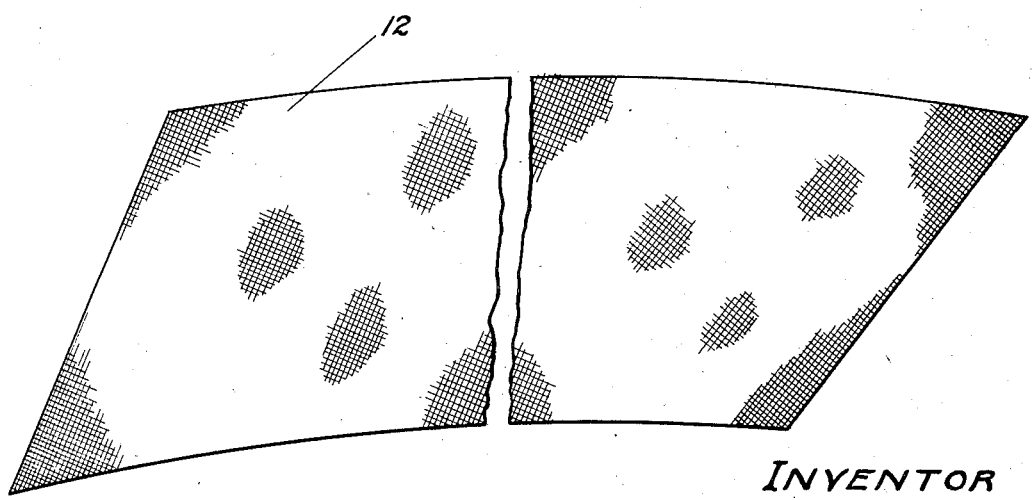
Figure 9:
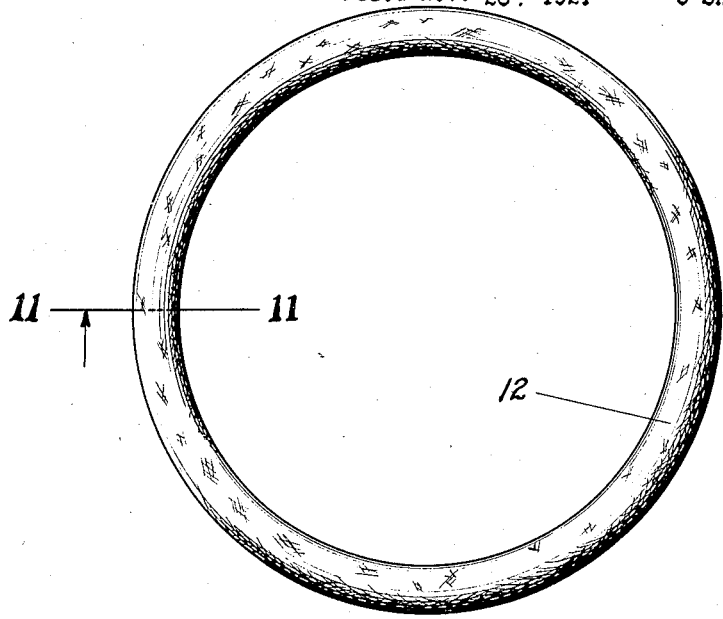
Figure 10:
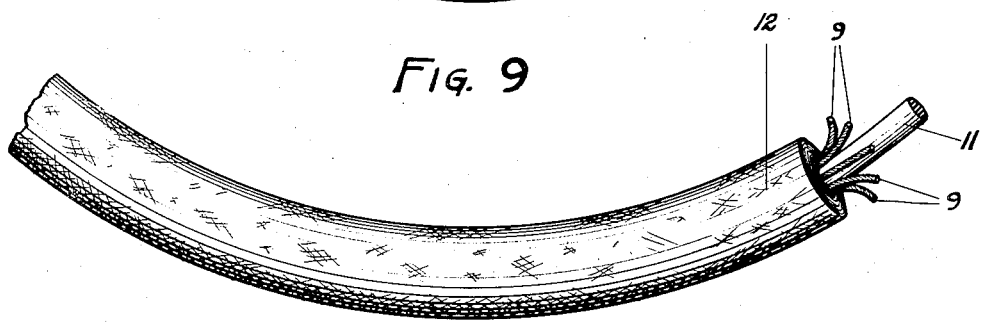
Figure 11:
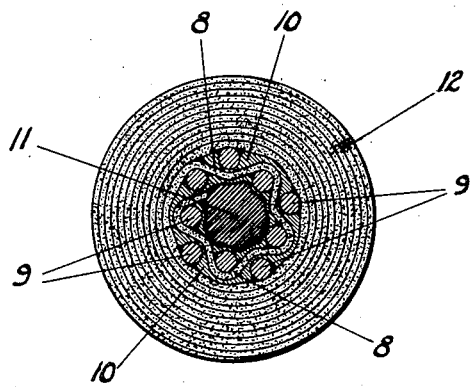

In the accompanying drawings forming part of this specification,

Figure 1 is a plan view of a form or mandrel showing the manner of placing and rolling the fabric thereon, Figure 2 is a similar view illustrating the belt in its completed or rolled form, Figure 3 is a detail sectional view, showing the manner of assembling the different elements used in the making of the belt upon the conical form or mandrel, Figure 4 is a perspective view of the flexible pad or filler that is inserted between the inner fabric sheet and the surface of the form, Figure 5 is a detail sectional view on a section line 5—5 of Figure 1, Figure 6 is a similar view on section line 6—6 of Figure 1, Figures 7 and 8 are detail views of the sheets of fabric of which the belt is composed, Figure 9 is a side view of the completed belt, Figure 10 is a section illustrating the relative position of the elements of the belt, Figure 11 is a sectional view on the line 11—11 of Figure 9.

In the drawing, 2 represents a form or mandrel on which the belt is rolled, preferably slightly tapered from one end to the other and mounted on a suitable support, such as the rod 3. The manner of supporting the form, however, is immaterial and may be modified in various ways. In carrying out my process, I place on the larger end of the form a ring or pad 4 of suitable yielding material. As shown, the ends of this ring may be beveled, as at 5, and preferably are fastened together by suitable means, such as a strap 6 having the well-known snap fasteners 7. This ring is tapered from one end to the other, thereby increasing in thickness from its outer toward its inner end, as indicated plainly in Figure 3, the object of this taper being to compensate for or offset the taper of the form so that when the first or inner sheet of fabric is applied, it will lie smoothly and evenly on the pad and be substantially the same diameter from end to end. The sheet of fabric is indicated by reference numeral 8. The pad interposed between this sheet and the form permits rolling of the tube with the reinforcing means laid thereon, and in practice, I prefer to make the diameter of the pad ring greater at its inner end, thus necessitating a diagonal cut of the sheet of fabric applied thereto. This is for the purpose of making the fabric tube sufficiently loose or slack on the form to allow the rolling of the reinforcing means therein to be completed when the pad is removed.

For the purpose of strengthening the belt and reducing the degree of stretch therein, I provide a reinforcing means consisting preferably of a cord 9, preferably of cotton fabric, laid on the sheet 8 and wrapped continuously around the form, as indicated by dotted lines in Figure 1. The loops or convolutions of the cord are distributed a suitable distance apart on the surface of the fabric sheet and over them I place a thin sheet of rubber 10, which conceals the cord and also covers the rubberized sheet beneath. The reinforcing cord loops are held in place on the fabric tube by the rubber sheet 10 during the rolling operation and the said sheet serves as a binder for uniting the cord and the convolutions of the fabric tube into a homogeneous compact mass when the belt is completed and vulcanized. The cord loops are shown in Figure 11 grouped around the core and embedded in the soft rubber sheet 10 and between the convolutions of the fabric, my purpose being to arrange them as near as may be possible in symmetrical form around the center of the belt and where the strain thereon will be substantially uniform.

At the outer end of the sheet 8 I place a core 11 of suitable material, preferably soft rubber, extending entirely around the form with its ends united, as indicated in Figure 1. This core lies at the outer edge of the rubberized sheet 8 and forms the center of the belt when the rolling process is begun. When these parts have been assembled, as described, the operator will roll the fabric sheet 8 over upon the core 11, and when several revolutions of the core have been made, the pad is removed, allowing the unrolled fabric to drop down upon the form and permitting the rolling of the fabric over the cord loops to be continued until the end of the tube is reached at a point adjacent the middle of the form. At this point the partially completed belt meets the tube formed of the second sheet of fabric 12 that is wrapped around the tapered end of the form and when the inner end of this tube is reached, the rolling action will be continued, the decreasing diameter of the form offsetting the increasing size of the belt, due to the rolling of the fabric thereon. When the belt reaches the smaller end of the form, as indicated in Figure 2, it will assume the shape and form indicated in Figures 9, 10 and 11, the soft rubber core occupying, of course, the center of the belt section, with the cord loops grouped symmetrically around it, lying in the soft rubber sheet which is shown in irregular form in the section and intertwined with the inner end of the fabric sheet 8. I have found that a belt made in this way will be stronger and less inclined to stretch unduly than when the cord loops are omitted and while various ways may be devised for arranging the cord loops in or between the convolutions of the fabric, I prefer to dispose them substantially as shown herein. The cord loops laid in the belt having practically no stretching quality, it is necessary to interpose the pad between the first sheet of fabric and the form or otherwise only a few rolls or convolutions could be made in the belt when the cord loops would become so tight that further rolling would be impossible. The use of this pad allows the first few convolutions to be made and then the pad may be removed and the rolling of the cord loops in the fabric completed. When this has been done, the outer fabric sheet can be readily rolled in its tubular form, aided by the decreasing diameter of the form.

The process, briefly, is as follows: I place the tapered pad on the surface of the form or mandrel, encircle it with a sheet of fabric cut to fit smoothly on the surface of the pad and form a tube. I then place a second sheet of fabric on the form, cut to fit the taper thereof, as indicated, and forming a second tube, one end of which is close to the inner end of the pad. On the peripheral surface of the first tube I place at one end a core ring and then at intervals on the surface of the tube I place the reinforcing means, preferably the cotton cord. I then cover this cord with a thin sheet of comparatively soft material, such as rubber, which will adhere to the cord loops and to the surface of the tube and hold the cord loops in place while the tube is being rolled. I then begin the rolling operation, turning the edge of the outer end of the tube over the cord and rolling the loops into the convolutions. As the convolutions are formed, the cord loops will become tighter and soon will prevent further rolling, and I then loosen the pad and remove it from the form. This allows the tube to drop onto the surface of the form and provides sufficient slack for the tube and cord loops to allow the rolling operation to be completed to the end of the tube. When this has been done I continue the rolling operation of the second tube, rolling it around the circular body formed by the rolling of the first tube and when the end of the second tube is reached, the belt will be ready for the vulcanizing operation.

I claim as my invention:

1. A process of belt making which consists in forming a tube of flexible material, placing reinforcing means at intervals thereon and then rolling one edge of the material from one end of the tube towards the other end thereof.

2. A process of belt making which consists in forming a tube of flexible material, placing reinforcing cords thereon, and then rolling one edge of the material from one end of the tube towards the other end thereof.

3. A process of belt making which consists in forming a tube of suitable fabric, placing a reinforcing cord on the surface of the tube at suitable intervals, then rolling one edge of the fabric from one end of the tube towards the other end thereof.

4. A process of belt making which consists in forming a tube of flexible material, placing reinforcing means at suitable intervals on the peripheral surface thereof, rolling one edge of the material from one end of the tube towards the other end thereof, and then vulcanizing the belt so formed.

5. A process of belt making which consists in forming a tube of flexible material, placing reinforcing means at suitable intervals on the peripheral surface thereof, rolling one edge of the material over one end of the tube towards the other end thereof, and then vulcanizing the belt so formed.

6. A process of belt making which consists in forming a tube of rubberized fabric, placing reinforcing means thereon at intervals, then rolling one edge of the fabric from one end of the tube towards the other end thereof.

7. A process of belt making which consists in forming a tube of rubberized fabric having its warp and woof threads running diagonally upon the surface of the tube, placing reinforcing means circumferentially on the surface of the tube, then rolling one edge of the fabric from one end of the tube towards the other end thereof.

8. A process of belt making which consists in forming a frusto-conical tube of rubberized fabric, placing reinforcing means at intervals on the circumferential surface thereof, then rolling one edge of the fabric from the large end of the tube towards the other end thereof.

9. A process of belt making which consists in forming a frusto-conical tube of rubberized fabric having its warp and woof threads running diagonally thereof upon the surface of the tube, placing reinforcing means circumferentially on the surface of the tube, then rolling one edge of the fabric from the larger towards the smaller end of the tube.

10. A process of belt making which consists in forming a tube of suitable material, placing on the circumferential surface thereof a series of reinforcing members, rolling one edge of the material from one end of the tube toward the other end thereof, thereby forming a ring belt that is circular substantially in cross section, and then vulcanizing the belt so formed.

11. A process of belt making which consists in forming a tube of flexible material, placing on the circumferential surface thereof a series of reinforcing members, adding a suitable binder to said members, and then rolling one edge of the material from one end of the tube toward the other end thereof.

12. A process of belt making which consists in forming a tube of rubberized fabric, placing on the peripheral surface thereof a series of reinforcing members, placing a rubber binder on said members, then rolling one edge of the fabric from one end of the tube toward the other end thereof.

13. A process of belt making which consists in forming a tube of flexible material, placing an annular core of soft material thereon at one end, then laying a reinforcing cord at intervals on the peripheral surface of the tube and finally rolling the edge of the tube adjacent the core toward the other end thereof.

14. A process of belt making which consists in forming a tube of flexible material, placing thereon at one end a core ring of yielding material, placing on the peripheral surface of the tube a reinforcing member, covering said member with a sheet of flexible material, and then rolling the tube from the end adjacent to the core towards the other end thereof.

15. A process of belt making which consists in placing a pad of suitable material upon a form, stretching a sheet of flexible material around said pad to form a tube, placing a non-stretching reinforcing member on the surface of said tube, rolling the tube from one end toward the other until several convolutions are formed, then removing said pad and continuing the rolling operation to the other end of the tube.

16. A process of belt making which consists in placing a tapered pad of yielding material upon a suitable form, wrapping a sheet of flexible material around said pad to form a tube, placing a core of yielding material on said tube at one end, laying a reinforcing cord on the surface of said tube at intervals, rolling said tube over said core until the fabric is taut, then removing the pad and continuing the rolling operation to the other end of the tube.

17. A process of belt making which consists in placing a tapered pad of yielding material upon a suitable form, wrapping a sheet of flexible material around said pad to form a tube, placing a core of yielding material on said tube at one end, laying a reinforcing cord on the surface of said tube at intervals, laying a sheet of flexible material over the cord, rolling said tube over said core until the fabric is taut, then removing the pad and continuing the rolling operation to the other end of the tube.

18. A process of belt making which consists in placing a pad of yielding material upon a form, wrapping a sheet of flexible material around said pad to form a tube, wrapping a second sheet of flexible material around the form at one end of said pad, placing a reinforcing cord on the surface of said first sheet, rolling said first sheet over said cord from one end of the tube towards the other end thereof, removing said pad and finally rolling said second sheet over the rolled first sheet.

19. A process of belt making which consists in placing a pad of yielding material upon a form, wrapping a sheet of flexible material around said pad to form a tube, wrapping a second sheet of flexible material around a form at one end of said pad, placing a core around one end of the tube formed of said first sheet, laying a reinforcing means on the peripheral surface of said first sheet, covering said reinforcing means with a suitable binder, rolling said first sheet from one end over said core and reinforcing means toward the other end, removing said pad and finally rolling said second sheet over the rolled first sheet.

20. As a new article of manufacture, a jointless, endless belt circular substantially in cross section composed of convolutions of fabric, a core and a reinforcing means.

21. As a new article of manufacture, a belt circular substantially in cross section composed of a fabric tube rolled upon itself from one end towards the other, and reinforcing means between successive convolutions of the fabric.

22. As a new article of manufacture, a belt circular substantially in cross section composed of a tube of rubberized fabric rolled from one end towards the other, and a plurality of reinforcing cord loops interposed in the convolutions of the fabric.

23. As a new article of manufacture, a belt circular substantially in cross section composed of a rubberized fabric tube rolled from one end towards the other, a central core and reinforcing members interposed in the convolutions around said core.

24. As a new article of manufacture, a belt circular substantially in cross section comprising a fabric tube rolled upon itself from one end towards the other, a core thereof, reinforcing means interposed in the convolutions of the fabric, and a binder in which the reinforcing means are embedded.

In witness whereof, I have hereunto set my hand this 25th day of November, 1921.

LEE MURRAY.